June 23, 1931. J. P. COELING 1,810,947
CUTTING HEAD FOR SHAPERS
Filed July 11, 1929

Inventor
John P. Coeling

Patented June 23, 1931

1,810,947

UNITED STATES PATENT OFFICE

JOHN P. COELING, OF SHEBOYGAN, WISCONSIN

CUTTING HEAD FOR SHAPERS

Application filed July 11, 1929. Serial No. 377,394.

This invention relates to a cutter head especially adapted for use on woodworking shapers.

The present type of cutting head widely used on woodworking shapers consists of two collars fitted on the spindle of the shaper and having shallow slots or grooves in their confronting faces, the cutting knives being fitted in the slots or grooves and being clamped therein by suitable clamping means usually in the form of nuts threadedly engaged with the spindle and bearing against the collars either directly or through washers into position between the nuts and the collars. Each cutting knife has at least one end projecting beyond the periphery of the collars. The collars are spaced apart a considerable distance as only very shallow grooves or slots are formed in the collars to receive edge portions of the cutting knife. The work or stock is usually cut to approximate form by a band saw and is cut to final or finished form by the shaper, the roughly outlined margin of the stock being presented to the knives of the shaper and a portion of the stock being brought against one of the collars as the stock is fed to the knives thereby causing the knives to shape or finish the stock according to the outline as cut by the band saw. Due to the spacing of the collars, it is necessary to take several cuts on the shaper before the edge of the stock is completely finished. The cutting edges of the knives are adapted to finish or shape the stock in a single cutting operation, but only a portion of the stock at a time may be presented to the knives because as the stock is fed to the knives it must be steadied or held against the collar. Wherever it is desired to shape or finish the stock with a single cut it has always been necessary heretofore to use a pattern with the stock, the pattern being clamped to the lower face of the stock so that the pattern will ride against the lower collar and the stock will be positioned between the collars and thus take the full cut of the knives.

The present invention proposes the provision of a cutting head of such novel construction that the margin of the work to be finished or shaped may be cut on the shaper in a single cutting operation and without the use of a pattern.

Another object of the present invention resides in the provision of a cutting head having this advantage and capacity and which retains all of the desirable features of the construction of the standard cutting head.

In carrying out the present invention a cutting head is provided which comprises upper and lower collars adapted to be fitted on a shaper spindle and having in their confronting faces opposed or aligned slots adapted to receive the cutting knives. Each slot at one end extends through the periphery of its collar but at its other end terminates short of its periphery. Each cutting knife when fitted in the slots has one end projecting beyond the end of its slots that extend through the periphery of its collar and consequently the collars, except for the cutting knives present smooth, unbroken peripheries. Preferably the lower collar is thicker, that is, has a greater vertical dimension than the upper collar and the slots in the lower collar are several times deeper than the slots in the upper collar so that the cutting knives for the major portion of their extent, or at least for a very substantial portion of their extent, are imbedded in the lower collar and the major or substantial portion of the cutting edges of the knives lie within the confines of the otherwise smooth and unbroken periphery of the lower collar. Conventional means is provided for clamping the collars to the spindle and to the cutting knives. With this novel organization, the stock or work may be shaped with a single cut and without the use of a pattern as it may be presented to the full cutting action of the knives and yet may ride on the unbroken periphery of the lower collar.

Other objects and advantages reside in certain novel features of the construction, arrangement and combination of parts which will be hereinafter more fully described and particularly pointed out in the appended claim, reference being had to the accompanying drawings forming a part of this specification, and in which:

Figure 1:
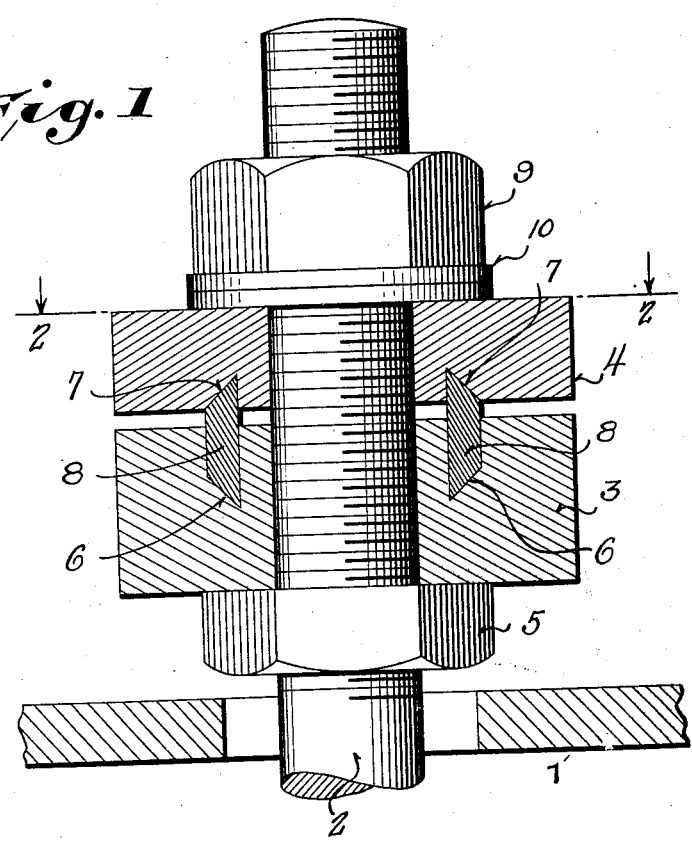
Figure 1 is a view in section taken in the plane of line 1—1 of Figure 2 looking in the direction of the arrow, parts being shown in elevation for the sake of illustration.
Figure 2:
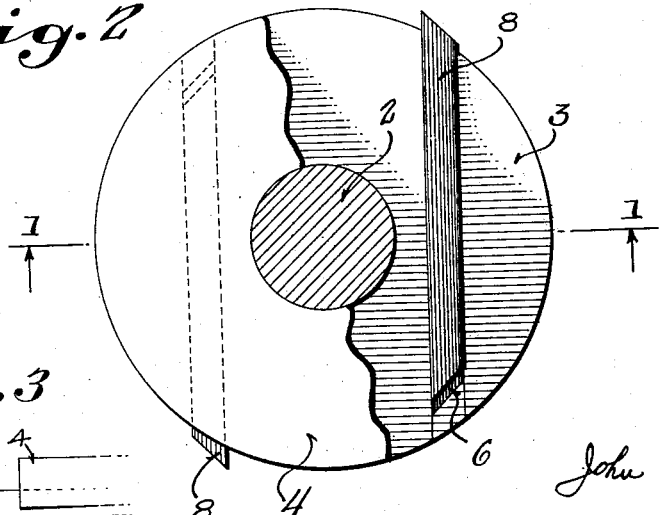
Figure 2 is a view in horizontal section taken on line 2—2 of Figure 1, parts being broken away and parts being shown in top plan for the sake of simplicity and illustration.

Referring to the drawings the numeral 1 designates the table of the conventional shaper. A spindle 2 projects up from the table as in the conventional shapers and is rotated in the usual manner. A lower collar 3 and an upper collar 4 are fitted on the spindle, the lower collar 3 bearing against a suitable abutment such as a nut 5. The collars 3 and 4 are of the same diameter, but the collar 3, that is, the lower collar is thicker, that is, has a greater vertical dimension than the collar 4. In the confronting faces of the collar, that is, in the upper face of the lower collar 3 and in the lower face of the upper collar 4, knife receiving grooves 6 and 7 are provided. These grooves are of similar shape except that the grooves 6 of the lower collar 3 are much deeper than the grooves 7 of the upper collar 4. Thus, when the blades or cutting knives 8 are received in the slots 6 and 7 the grooves 7 of the upper collar receive only the beveled upper edges of the blades, but the grooves 6 of the lower collar receive not only the beveled edges, but also a substantial, or indeed, the major portion of the body of the blade. In other words, the blades are practically imbedded in the lower collar 3. As will be understood from Figure 2, the slots 6 and 7 extend transversely of the collars and each slot extends through the periphery of its collar at one end, but at its opposite end terminates short of the periphery of its collar so that except for the projecting cutting edges of the blades the collars present smooth and unbroken peripheral surfaces.

For clamping the collars 3 and 4 in position on the spindle and for securing the cutting knives 8 rigidly and securely in their slots 6 and 7 suitable clamping means is provided and as shown may consist of a nut 9 threaded on the spindle 2 for engaging the washers 10 interposed between the nut 9 and the upper collar 4. When the nut 9 is tightened up the collars 3 and 4 and the knives 8 are clamped between the nut 9 and the abutment or nut 5.

Figure 3:
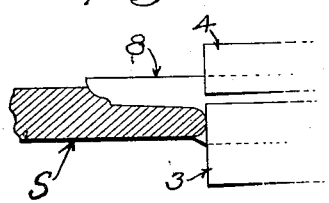
Figure 3 is a fragmentary view in side elevation showing how the cutting head effects a complete shaping operation with a single cut and without the use of a pattern.

As shown in Figure 3 with a cutting head of this character, it is entirely safe, convenient and practical to completely shape band sawed stock S with a single cutting operation and without the use of a pattern. This new result follows from the provision of the thick lower collar with its deep grooves in which the substantial portion of the knives are received and also from the feature of having the periphery of at least the lower collar unbroken and smooth except for the cutting knives. As a result of these features, a substantial portion of the edge of the stock or work rides on the lower collar and yet the stock is in the range of action of the entire cutting edge of each and every knife. Along with this advantage all of the desirable features of the conventional cutting head are preserved. When it is considered that cutting heads as at present constructed require the use of a pattern, and the use of a pattern is impracticable and undesirable under most circumstances, or else require several cuts to finish the edge of the stock it will be appreciated that the cutting head above described and embodying the present invention speeds up production and reduces the cost and this without any elaboration of structure or any disadvantageous departure from standard practice.

The invention claimed is:

A cutter head for use with wood working shapers comprising upper and lower similar circular collars of substantially the same diameter and adapted to be fitted on a shaper spindle, said collars having opposed knife receiving slots in their confronting faces, the slots in the lower collar being substantially deeper than the slots in the upper collar, a knife fitted in each pair of vertically alined slots and embedded for a substantial portion of its extent in the direction parallel to the axis of the spindle in the lower collar so that a substantial portion of the knife lies within the confines of the periphery of the lower collar, each slot of the lower collar, at least, terminating at one end inwardly of the periphery of the collar, the periphery of the lower collar being smooth except for the projecting end of the knife and being entirely exposed whereby stock may be presented to the entire cutting edge of the knife while positioned to ride on the smooth periphery of the lower collar, and means coacting with the collars to force them into clamping engagement with the knife.

In witness whereof, I hereto affix my signature.

JOHN P. COELING.